(12) United States Patent
Singh et al.

(10) Patent No.: US 9,167,370 B1
(45) Date of Patent: Oct. 20, 2015

(54) DELAYING REGISTRATION ON ROAMING NETWORKS

(75) Inventors: Jasinder Pal Singh, Olathe, KS (US); Chandiramohan Vasudevan, Olathe, KS (US)

(73) Assignee: Sprint Communications Company L.P, Overland Park, KS (US)

( * ) Notice: Subject to any disclaimer, the term of this patent is extended or adjusted under 35 U.S.C. 154(b) by 482 days.

(21) Appl. No.: 13/348,314

(22) Filed: Jan. 11, 2012

(51) Int. Cl.
*H04W 4/00* (2009.01)

(52) U.S. Cl.
CPC .................................... *H04W 4/00* (2013.01)

(58) Field of Classification Search
CPC .................................................. H04W 4/00
USPC .......... 455/432.2, 432.3, 435.1, 435.2, 435.3, 455/436, 438, 443
See application file for complete search history.

(56) References Cited

U.S. PATENT DOCUMENTS

| | | | | |
|---|---|---|---|---|
| 6,708,031 B2 * | 3/2004 | Purnadi et al. | ................. | 455/436 |
| 2007/0173252 A1 * | 7/2007 | Jiang | ........................... | 455/432.1 |
| 2009/0258648 A1 * | 10/2009 | Willey | ....................... | 455/435.1 |
| 2010/0195542 A1 * | 8/2010 | Li et al. | .......................... | 370/271 |
| 2011/0274034 A1 * | 11/2011 | Rautiola et al. | ................ | 370/328 |

* cited by examiner

*Primary Examiner* — Shahriar Behnamian

(57) ABSTRACT

Systems, methods, and computer-readable media, for facilitating delaying registration in association with roaming networks are provided. In embodiments, a mobile device associated with a border coverage is recognized. Such a recognition may occur based on the mobile device alternating between being connected to a home network and a roaming network. Based on the mobile device being associated with the border coverage, registration with the roaming network to obtain a mobile internet protocol address is delayed.

18 Claims, 3 Drawing Sheets

DELAYING REGISTRATION ON ROAMING NETWORKS

BRIEF SUMMARY

A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter. In brief, and at a high level, this disclosure describes, among other things, delaying registration on roaming networks. Utilizing embodiments hereof, registration, such as MIP registration, is delayed in association with roaming networks, for example, when the mobile device is located at coverage boundary. In this way, registration requests are not repetitively made when a mobile device frequently transfers between a home network and a roaming network without performing a data session, thereby reducing roaming charges for usage of the roaming network.

BRIEF DESCRIPTION OF THE DRAWINGS

Illustrative embodiments of the present invention are described in detail below with reference to the attached drawing figures, and wherein.

DETAILED DESCRIPTION

Figure 1:
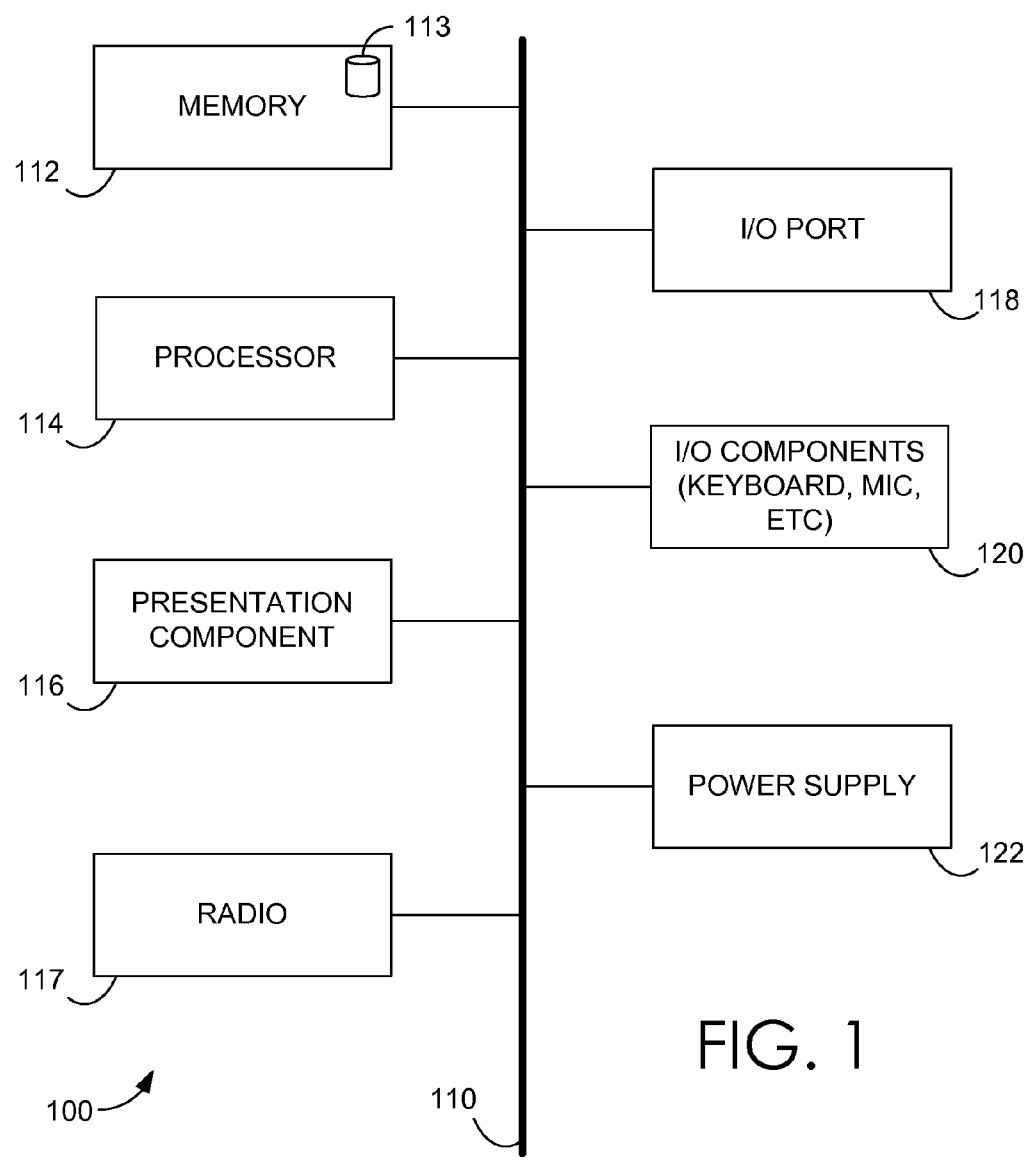
FIG. 1 depicts an exemplary computing device according to embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Embodiments of the present invention provide systems, methods, and computer-readable media for delaying registration in association with roaming networks. Utilizing embodiments hereof, registration, such as MIP registration, for a mobile device in connection with a roaming network is delayed. In this regard, when the mobile device is positioned at or near a coverage boundary, registration to acquire a MIP address is delayed such that registration does not occur each instance that the mobile device is in an area covered by a roaming network. That is, embodiments of the invention are intended to facilitate a mobile device to avoid registering with a roaming network when the mobile device is not participating in a data call but is simply located in an area of a roaming network. Accordingly, such embodiments reduce a mobile device's registrations with a roaming network when the mobile device is located at or near a coverage boundary and thereby reduces roaming charges that may be applied in association with registrations on a roaming network.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

3G Third-Generation Wireless Technology
 4G Fourth-Generation Cellular Communication System
 BTS Base Transceiver Station
 CD-ROM Compact Disk Read Only Memory
 CDMA Code Division Multiple Access
 GPRS General Packet Radio Service
 GSM Global System for Mobile communications: originally from Groupe Special Mobile
 DVD Digital Versatile Discs
 EEPROM Electrically Erasable Programmable Read Only Memory
 LED Light Emitting Diode
 LTE Long Term Evolution
 MIP Mobile Internet Protocol
 NID Network ID
 PC Personal Computer
 PDA Personal Digital Assistant
 PDSN Packet Data Serving Node
 RAM Random Access Memory
 RNC Radio Network Controller
 ROM Read Only Memory
 SID System ID
 TDMA Time Division Multiple Access
 UMTS Universal Mobile Telecommunications Systems Further, various technical terms are used throughout this description. An illustrative resource that fleshes out various aspects of these terms can be found in Newton's Telecom Dictionary, 25th Edition (2009).

Embodiments of the technology may take the form of, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Referring to the drawings in general, and initially to FIG. 1 in particular, a block diagram of an illustrative communications device according to one embodiment is provided and referenced generally by the numeral 100. Although some components are shown in the singular, they may be plural. For example, communications device 100 might include multiple processors or multiple radios, etc. As illustratively shown, communications device 100 includes a bus 110 that directly or indirectly couples various components together including memory 112, a processor 114, a presentation component 116, a radio 117 (if applicable), input/output ports 118, input/output components 120, and a power supply 122.

Memory 112 might take the form of memory components previously described. Thus, further elaboration will not be provided here, only to say that memory component 112 can include any type of medium that is capable of storing information (e.g., a database). A database can be any collection of records. In one embodiment, memory 112 includes a set of embodied computer-executable instructions 113 that, when executed, facilitate various aspects disclosed herein. These embodied instructions will variously be referred to as "instructions" or an "application" for short.

Processor 114 might actually be multiple processors that receive instructions and process them accordingly. Presentation component 116 includes the likes of a display, a speaker, as well as other components that can present information (such as a lamp (LED), or even lighted keyboards).

Numeral 117 represents a radio(s) that facilitates communication with a wireless-telecommunications network. Illustrative wireless telecommunications technologies include CDMA, GPRS, TDMA, GSM, WiMax, LTE, and the like. In some embodiments, radio 117 might also facilitate other types of wireless communications including Wi-Fi communications and GIS communications. As can be appreciated, in various embodiments, radio 117 can be configured to support multiple technologies and/or multiple radios can be utilized to support multiple technologies.

Input/output port 118 might take on a variety of forms. Illustrative input/output ports include a USB jack, stereo jack, infrared port, proprietary communications ports, and the like. Input/output components 120 include items such as keyboards, microphones, speakers, touch screens, and any other item usable to directly or indirectly input data into communications device 100. Power supply 122 includes items such as batteries, fuel cells, or any other component that can act as a power source to power communications device 100.

As previously mentioned, embodiments of the present invention facilitate delaying registration in association with a roaming network. Utilizing embodiments hereof, registration, such as MIP registration, is delayed in association with a roaming network, for example, when a mobile device is located at coverage boundary. In this way, registration requests are not repetitively made when a mobile device transfers between a home network and a roaming network without performing a data session, thereby reducing roaming charges for usage of the roaming network.

Accordingly, embodiments of the present invention provide systems, methods, and computer-readable media for reducing mobile device roaming. Mobile device roaming refers to a mobile device utilizing a roaming network to obtain services, such as voice services (e.g., enable a mobile device to make and/or receive voice calls) and/or data services (e.g., enable a mobile device to send and/or receive data). As such, a mobile device that is roaming uses a roaming network rather than a home network to communicate with another computing device, such as a mobile device, a server, a personal computer, or the like.

Generally, a mobile device within a coverage area of a home network utilizes the home network to obtain services. That is, in instances where a mobile device is within a coverage area of a home network, the home network generally provides services to the mobile device. In some cases, however, the mobile device might be capable of utilizing services associated with a roaming network and the home network. In this regard, a mobile device can be positioned at a border coverage or coverage boundary at which a home network and roaming network can overlap in coverage provided to a mobile device. In such a case, the network providing services (e.g., data services) to the mobile device may alternate depending on specific radio frequency coverage. Radio frequency coverage can fluctuate for any number of reasons, such as, for example, weather conditions, tree coverage, network traffic, quality of services, etc. Accordingly, a stationary mobile device located within a border coverage or coverage boundary may alternate between two or more networks. For instance, a mobile device may initially be connected to a home network, transfer to a roaming network, transfer back to the home network, and so on.

In transitioning from a home network to a roaming network, the mobile device registers with the roaming network to acquire an internet protocol address, such as a mobile internet protocol address. Such a registration generally occurs even if the mobile device is not being used for data services. In other words, a mobile device might be idle in that it is not participating in a data session, but still utilizing a roaming network to obtain a MIP address. Such a registration can unnecessarily occur frequently when a mobile device is located or positioned within a border coverage. By way of example only, a mobile device within a border coverage may alternate between a home network and a roaming network even though the mobile device is not being used for data communication. Each instance that the mobile device alternates to the roaming network, registration for a MIP address occurs resulting in roaming charges to the customer and/or home network. In this regard, embodiments of the present invention facilitate reducing roaming of a mobile device by delaying registration with a roaming network, for example, when the mobile device is located within a border coverage.

According, in one aspect, the present invention is directed to one or more computer-readable media having computer-executable instructions embodied thereon that, when executed, perform a method for facilitating delaying registration in association with roaming networks. The method includes recognizing that a mobile device is associated with a border coverage in that the mobile device alternates between connection to a home network and a roaming network. Based on the mobile device being associated with the border coverage, registration with the roaming network to obtain a mobile internet protocol address is delayed.

In another aspect, embodiments of the present invention are directed to one or more computer-readable media having computer-executable instructions embodied thereon that, when executed, perform a method for facilitating delaying registration in association with roaming networks. The method includes identifying that a mobile device is located within a border coverage area in which the mobile device alternates acquirement of a home network and a roaming network. The method also includes detecting that the mobile device is currently connected to the roaming network. In response to identifying that the mobile device is within the border coverage area and connected to the roaming network, mobile internet protocol registration with the roaming network is delayed at least until a lapse of a registration delay.

In yet another aspect, a method for facilitating delaying registration in association with roaming networks. The method includes recognizing that a mobile device having border coverage is connected to a roaming network. A registration delay that indicates an amount of time for delaying mobile internet protocol registration in association with the roaming network is identified. The mobile internet protocol registration is delayed in accordance with the registration delay. The mobile internet protocol registration is requested from the roaming network.

Figure 2:
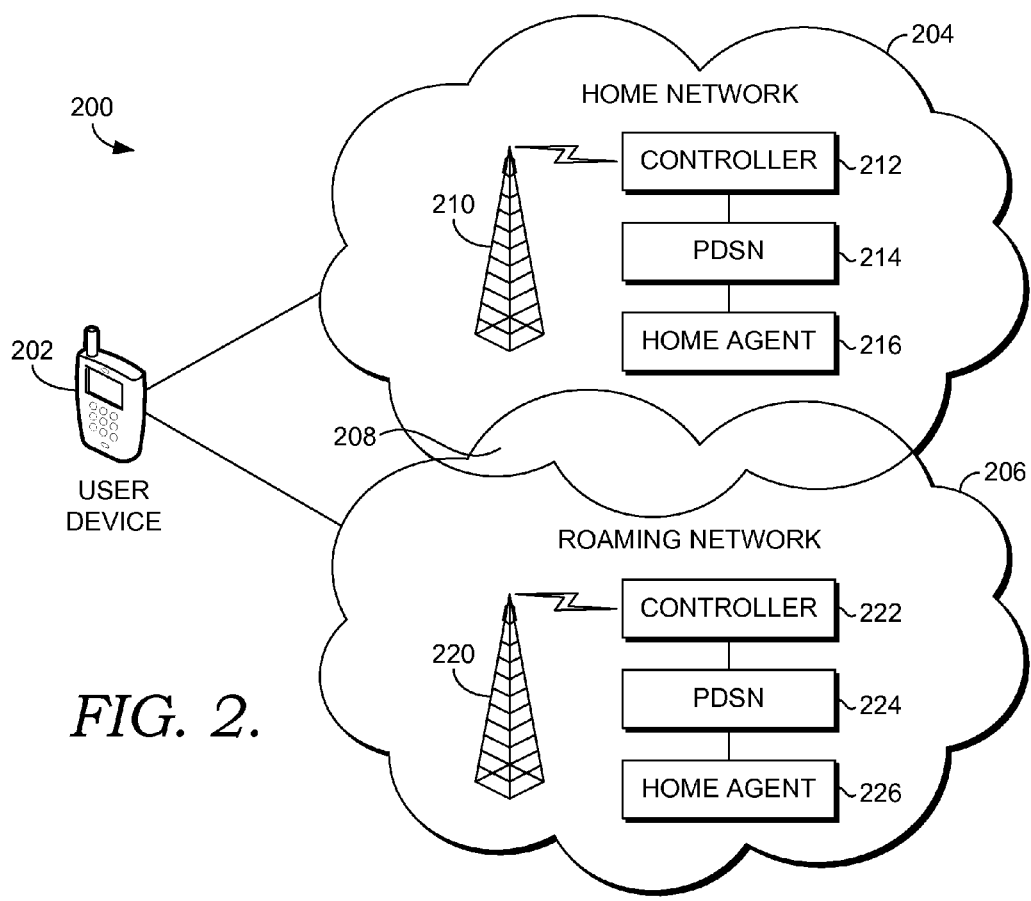
FIG. 2 is a schematic view of an exemplary communications environment suitable for use in implementing embodiments of the present invention.

Turning now to FIG. 2, an exemplary network environment suitable for use in implementing embodiments of the present invention is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

In the network environment 200, a user device 202 may communicate with other devices. The user device 202 may take on a variety of forms, such as a personal computer (PC), a laptop computer, a tablet, a mobile phone, a personal digital assistant (PDA), a server, or any other device that is cable of communicating with other devices. For example, the user device 202 can take on any form, such as, for example, a mobile device, a landline device, or any other computing device capable of communication with the other devices. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, a user device comprises a wireless or mobile device with which a wireless telecommunications network is utilized for communication (e.g., voice and/or data communication). In this regard, the mobile device can be any mobile computing device that communicates by way of a wireless network (e.g., a wireless telecommunications network). As such, the mobile device communicates with other devices using a wireless telecommunications network(s).

The user device 202 communicates with other computing devices (e.g., a mobile device(s), a server(s), a personal computer(s), etc.) utilizing a network, such as the home network 204 and/or the roaming network 206. In embodiments, each of home network 204 and/or roaming network 206 is a wireless telecommunications network. A wireless telecommunications network refers to any type of telecommunications network that is wireless. Examples of a wireless telecommunications technologies that might be compatible with the home network 204 and/or the roaming network 206 include, but are not limited to Global System for Mobile Communications (GSM), General Packet Radio Service (GPRS), Code Division Multiple Access (CDMA), CDMA2000, CDMA-One, Time Division Multiple Access (TDMA), Universal Mobile Telecommunications Systems (UMTS), Integrated Digital Enhanced Network (iDEN), WiMAX, 3G, 4G, Long Term Evolution (LTE), and Personal Communications Service (PDCS). A wireless telecommunications network might include an array of devices or components, some of which are not shown so as to not obscure more relevant aspects of the invention. Components such as a base station, a communications tower, or even access points (as well as other components) can provide wireless connectivity in some embodiments. Home network 204 and/or roaming network 206 can include multiple networks, as well as being a network or networks, but is shown in more simple form so as to not obscure other aspects of the present invention.

The home network 204 is a wireless telecommunications network associated with a wireless telecommunications provider that provides services to the user device 202. In this regard, a home network is generally used to provide services to a mobile device when the mobile device is within the coverage area of the home network. Such services might include voice services that enable making and receiving voice calls, data services that enable sending and receiving data, or other services provided by a wireless telecommunications provider. In embodiments, a mobile device user enters into a contract with a wireless telecommunication provider in connection with a home network to obtain wireless services. Accordingly, the mobile device, or user associated therewith, might be a subscriber of the wireless telecommunications provider, or home network associated therewith, to receive wireless services.

The roaming network 206 is a wireless telecommunications network other than a home network of the user device that can provide services to the user device. A roaming network can be any wireless telecommunications network that a user device can establish a connection with other than the home network. Generally, a roaming network can provide services (e.g., voice services and/or data services) to a user device when the user device is outside geographical coverage of a home network of the mobile device. In embodiments, a wireless telecommunication provider in association with a home network contracts (e.g., via a roaming agreement) with a wireless telecommunications provider in association with a roaming network such that a user device can utilize a roaming network to obtain services, for example, in instances that the mobile device is outside of coverage of the home network (or can obtain better coverage). In such an embodiment, the user device, or user device user, might not be a subscriber of the roaming network or the wireless telecommunications provider thereof.

As illustrated in FIG. 2, a user device 202 can be located at or within a coverage boundary or border coverage 208. A coverage boundary or border coverage, as used herein, refers to a area (e.g., geographical area) at which a user device might utilize a home network and a roaming network. That is, a user device located within a coverage boundary or border coverage may receive services provided by a home network and/or a roaming network. The user device 202 within a border coverage can alternate between a home network and a roaming network. The specific network providing services may depend on radio frequency (RF) conditions associated with the network(s). For example, radio frequency conditions can be altered based on weather conditions, network traffic, tree coverage, precise mobile device location, quality of service provided, etc. By way of example only, the user device 202 positioned with a border coverage may initially utilize services of the home network 204 for data and/or voice communication. Based on a change of radio frequency conditions (e.g., network traffic, noise to traffic ratio, etc.) provided to the user device 202, the user device 202 may transfer to a roaming network.

The user device 202 communicates with other devices by way of a wireless transceiver, such as wireless transceiver 210 and/or wireless transceiver 220. A wireless transceiver serves as a transceiver for wireless communications between the user device 202 and a network, such as a home network 204 and/or a roaming network 206. Examples of wireless transceivers include, but are not limited to, a base station transceiver and a Node B. Additional examples of wireless transceivers include Wi-Fi and WiMax compatible transceivers. In embodiments, wireless transceivers 210 and/or 220 are considered a component of a corresponding wireless telecommunications network with which the user device 202 communicates. As such, wireless transceiver 210 might be a component of the home network 204, and wireless transceiver 220 might be a component of the roaming network 206.

In the home network 204 and/or the roaming network 206, the user device 202 communicates, for example, using a controller and a PDSN. Controller 212 and controller 222 are used for radio resource management and function in connection with the home network 204 and the roaming network 206, respectively. In embodiments, controller 212 and/or controller 222 are radio network controllers (RNC). The controller 212 can communicate with PDSN 214, and the controller 222 can communicate with PDSN 224. PDSN 214 and PDSN 224 act as a connection point between the access networks and IP networks. Such PDSNs generally manage sessions between the mobile provider's core IP network and the mobile device. As can be appreciated, although a PDSN is illustrated, which is a component of a CDMA mobile network, any similarly functioning component is contemplated to be within the scope of embodiments of the present invention.

The home agent 216 generally provides an internet protocol (IP) address for usage by the user device 202 when the user device utilizes the home network 204. By comparison, the foreign agent 226 generally provides an internet protocol (IP) address for usage by the user device 202 when the user device utilizes the roaming network 206. In embodiments, such IP addresses for the user device 202 are mobile internet protocol (MIP) addresses. A MIP address refers to an address that enables a user device employing MIP to communicate over a network.

In operation, and by way of example only, assume that the user device 202 is located within boundary coverage 208 such that the user device 202 may alternate services (e.g., data services) being provided by the home network 204 and the roaming network 206. Assume further that the user device 202 is initially established with the home network 204. Now assume that radio frequency conditions associated with the home network 204 decrease such that data services for the user device 202 are to be provided by the roaming network 206. For example, network traffic associated with the home network 204 may have increased, weather conditions may have decreased the coverage provided to the user device 202, etc.

Rather than immediately registering with the roaming network 206 to acquire an IP address (e.g., MIP address), the user device 202 can delay registration with the roaming network 206 for an IP address. In this regard, an idle or inactive mobile device can delay obtaining an IP address that is not needed by the user device 202 since the user device 202 is not actively participating in data transmission. An idle user device, as used herein, refers to a mobile device operating in an idle operation mode (i.e., an idle mode). A mobile device in an idle mode is a mobile device that is not actively utilizing services, such as data services of a wireless telecommunications network. For example, a mobile device is in an idle mode (i.e., an idle mobile device) when the mobile device is not being used for data transmission (e.g., utilizing a web browser or an application).

Figure 3:
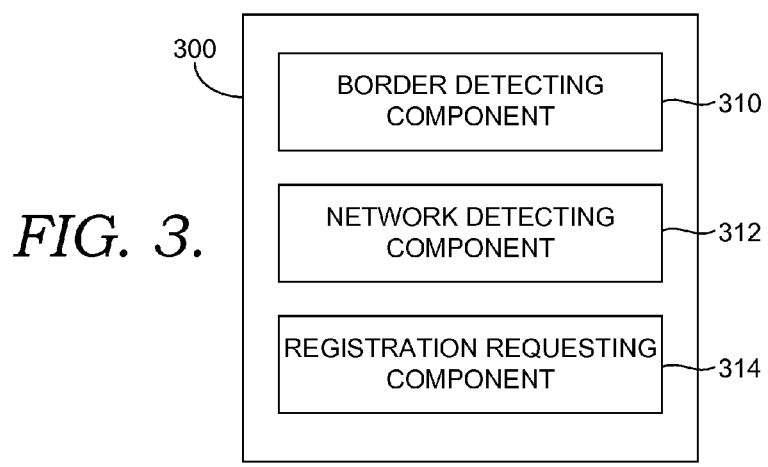
FIG. 3 provides an exemplary user device that is utilized to delay registration with a roaming network, in accordance with an embodiment of the present invention.

Referring now to FIG. 3, FIG. 3 illustrates an exemplary user device 300 that is utilized to delay registration with a roaming network to obtain an IP address. An exemplary user device 300 includes a border detecting component 310, a network detecting component 312, and a registration requesting component 314 associated with a user device. In some embodiments, one or more of the illustrated components may be implemented as one or more stand-alone applications. In other embodiments, on or more of the illustrated components may be integrated directly into the operating system or an application of the user device 202. It will be understood by those of ordinary skill in the art that the components illustrated in FIG. 3 are exemplary in nature and in number and should not be construed as limited. Any number of components may be employed to achieve the desired functionality within the scope of embodiments hereof. Further, components may be located on any number of computing devices.

The border detecting component 310 is configured to detect when the user device, such as the user device 202 of FIG. 2, is positioned within a border coverage. As previously mentioned, a border coverage refers to an area (e.g., geographical area), in which a user device can utilize services of a home network and/or a roaming network. In this regard, a user device within a border coverage might alternate, switch, or ping-pong between a home network and a roaming network.

In one embodiment, border coverage is detected based on a system ID (SID) and/or a network ID (NID). Generally, the home network 204 and the roaming network 206 of FIG. 2 include or are associated with a SID and/or NID that are unique such that the user device 300 can identify or detect which network is providing coverage to the user device 300. Such SIDs and/or NIDs are broadcast by the corresponding network such that the user device 300 can detect the network providing coverage.

Accordingly, based on the SIDs and/or NIDs received or recognized by the user device, the border detecting component 310 can identify or determine that the user device is positioned in a border coverage area. For example, the border detecting component 310 can recognize that the SIDs and/or NIDs are frequently alternating, alternating a specific amount of instances within a time period, alternating above a predetermined threshold, both available, etc. In a case that network alternating is detected, the border detecting component 310 can designate or determine that the user device 300 is within or associated with a border coverage.

In some embodiments, recognizing border coverage may be employed when the user device 300 is idle. By way of example only, the user device 300 may only detect when the user device is in a border coverage region when the user device 300 is not being utilized to transmit or perform a data call. In such an embodiment, the user device 300 can also be configured to determine when the user device is idle to trigger border coverage detection. In other embodiments, border coverage can be recognized at any time.

The network detecting component 312 is configured to detect association with a roaming network. In this regard, upon determining that the user device 310 is within a border coverage area, the network detecting component 312 can recognize or identify when the user device 202 is to receive services from a roaming network. Such an identification may occur when the radio frequency conditions associated with a home network have decreased to a point that the home network has at least temporarily dropped or discontinued services being provided to the user device or transferred services such that a roaming network is to provide services requested by the user device 202. Identification or association with a roaming network might be detected, for example, using SIDs and/or NIDs broadcast by the roaming network.

The registration requesting component 314 is configured to control or manage requests for registration with a roaming network to obtain an IP address (e.g., a MIP address). In embodiments, when it is determined that the user device 300 exists in or has border coverage, the registration requesting component 314 can delay requesting an IP address from a roaming network. A registration request, an IP registration request, or an MIP registration request may include, among other things, an indication for a desire to obtain an IP or MIP address (e.g., in association with a roaming network.

Accordingly, as the user device 300 detects usage of a roaming network (e.g., the user device 300 establishes connection with a BTS of a roaming network when in border coverage), the registration requesting component 314 can block or avoid registering for an IP address. In this regard, the registration requesting component 314 can delay communicating a registration request to the roaming network. Such a time period for a registration delay can be any time period. For example, in one embodiment, an initial registration delay might be two minutes such that a registration request is not provided for at least two minutes upon connection with the roaming network. Although two minutes is provided for illustration purposes, as can be appreciated, any amount of delay can be used in various implementations. Such a registration delay might be a default or predetermined amount of time or dynamically determined, for example, based on network conditions or location of the user device.

At the lapse of the initial registration delay, the registration requesting component 314 can transmit a registration request for an IP address to the roaming network. In this regard, upon expiration of the registration delay, the user device 300 can acquire an IP address such that the user device can utilize the IP address to perform data calls.

In some embodiments, a registration request for an IP address can be further delayed. In one example, if the user device 300 has established a connection with the home network and returned back to the roaming network within the time period for the registration delay, the registration delay can be increased or incremented. For example, upon the lapse of the initial registration delay, the user device (e.g., the registration requesting component 314, the network detecting component 312, and/or the border detecting component 310) can identify that the user device 300 has alternated between the roaming network and home network at least one time. In such a case, the registration request can be further delayed in accordance with a secondary registration delay. A secondary registration delay can be any amount of time. In some embodiments, the secondary registration delay can be the same amount of time as the initial delay. In this regard, assume that a registration request is initially delayed for two minutes. Upon determining to further delay communication of a registration request, a second two minute delay can be imposed. In another embodiment, the initial delay can be adjusted by a predetermined amount of time or dynamically determined amount of time to obtain a secondary registration delay. For example, an initial two minute delay can be increased to a five minute delay at which successive registration request are delayed by five minutes. In another example, an initial two minute delay can be incrementally increased by a multiple, such as a multiple of two. For instance, an initial delay, a first secondary delay might be four minutes, and a second secondary delay might be six minutes. As can be appreciated, a secondary delay can be any amount of time that can be utilized to extend delaying a request for an IP address from a roaming network.

As can be appreciated, in the case that a user of the user device 300 initiates or originates a data call, such as accessing a web browser or an application, any applicable delay for registration for an IP address can be overwritten. In this regard, a user wishing to utilize an idle user device can initiate a request for an IP address such that data calls can be successfully carried out by the device. Accordingly, the user device 300 can further be configured to detect user initiation of a data call and, in response thereto, request registration of an IP address from a roaming network.

Figure 4:
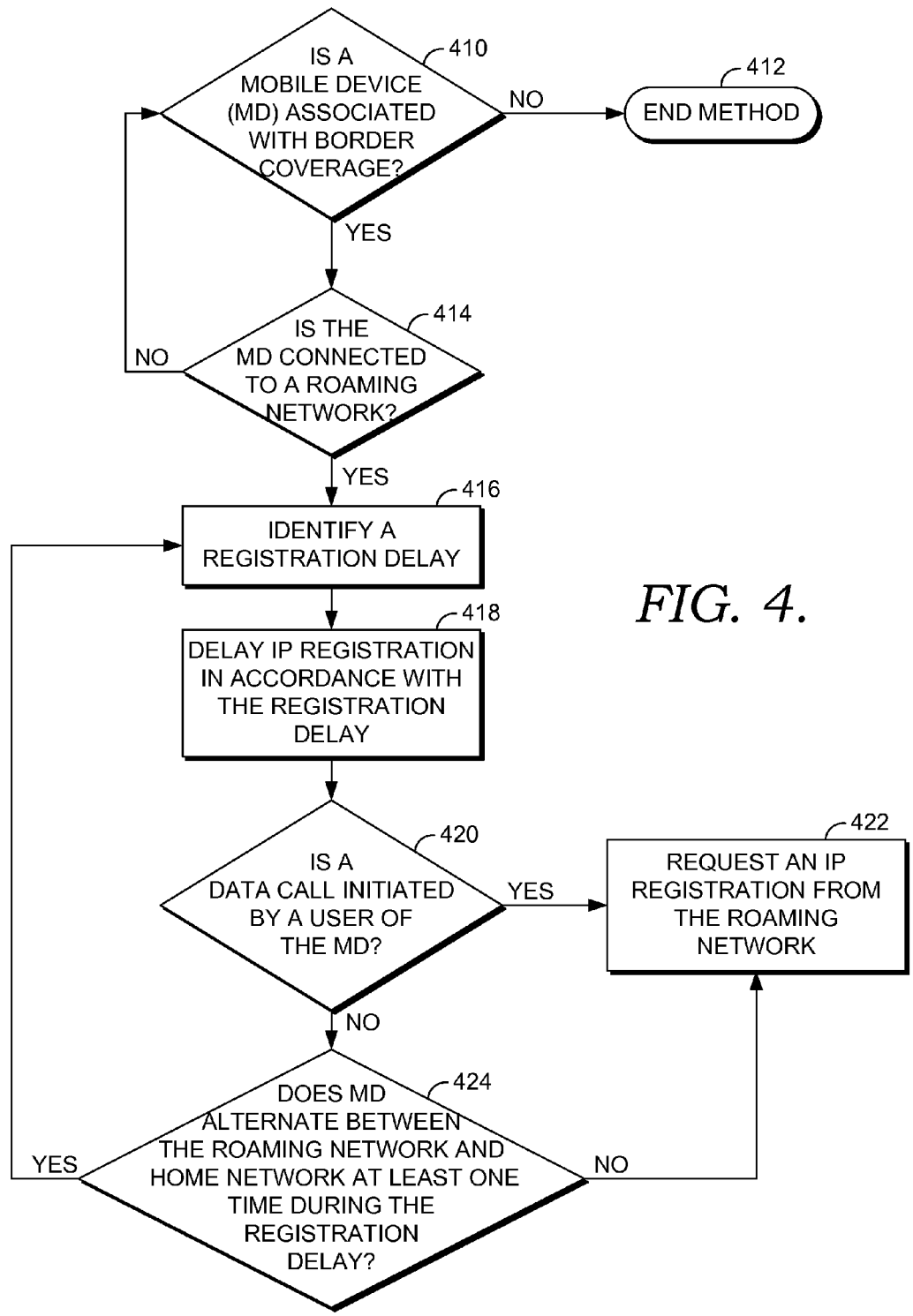
FIG. 4 provides an exemplary method for facilitating delaying registration in association with roaming networks, in accordance with an embodiment of the present invention.

With reference to FIG. 4, a flow diagram is shown illustrating a method 400 for facilitating delaying registration in association with roaming networks, in accordance with an embodiment of the present invention. In embodiments, method 400 can be performed at a user device, such as user device 202 of FIG. 2 and/or user device 300 of FIG. 3. Initially, as indicated at block 410, it is determined if a mobile device is associated with border coverage. In this regard, a determination is made as to whether the mobile device is within a border coverage area. Such a determination is generally made when the user device can receive services from both a home network and a mobile network and alternates connection between the two networks. In embodiments, SIDs and/or NIDs broadcast by the respective networks can be recognized by the user device and utilized to determine whether the mobile device is within a border coverage. For example, if the user device alternates between a home network and a roaming network in accordance with a threshold frequency (e.g., within a particular amount of time), a determination may be made that the user device is located within a border coverage region.

If it is determined that the mobile device is not associated with border coverage, the method ends, as indicated at block 412. If, however, it is determined that the mobile device is associated with border coverage, at block 414, it is determined if the mobile device is connected to a roaming network. If the mobile device is not connected to a roaming network, the method returns to block 410 to continue detection of mobile device association with border coverage and connection to a roaming network. As can be appreciated, when the mobile device is connected to the home network, it is not necessary to avoid roaming charges as the home network is being utilized for services.

If the mobile device is connected to a roaming network, at block 416, a registration delay is identified. In embodiments, an initial registration delay or a secondary registration delay can be identified. Such an initial registration delay and/or a secondary registration delay can be identified based on predetermined values, referenced using a lookup system, dynamically calculated or determined, etc.

Thereafter, at block 418, IP registration is delayed in accordance with the identified registration delay. Accordingly, the mobile device delays transmitting a registration request to the roaming network based on the identified registration delay.

At block 420, it is determined whether a data call is initiated by a user of the mobile device. Such a data call might be initiated, for example, when the user of the mobile device desires to utilize a web browser or application (e.g., email) via the Internet. A data call initiated by a user can be initiated and/or detected at any time during a registration delay. If a data call is initiated by a user of the mobile device, at block 422, an IP address is requested from the roaming network. In this regard, the registration delay can be voided or overridden such that the mobile device can perform the appropriate data calls desired by the user.

On the other hand, if a data call is not initiated by a user of the mobile device, at block 424, it is determined if the mobile device alternated connection between the roaming network and a home network at least one time during the registration delay. Such a determination can be made at any time during the registration delay. For example, establishing a connection with the home network and returning to the roaming network can be detected upon reestablishment with the roaming network regardless of whether the registration delay lapsed. On the other hand, such a determination can be made upon expiration of the registration delay. Alternating connections can be identified or recognized in any manner. In one implementation, alternating connections can be detected using SIDs and/or NIDs broadcast by the corresponding home and roaming networks.

If the mobile device remains continuously connected to the roaming network, an IP registration request is communicated from the mobile device to the roaming network, as indicated at block 422. On the other hand, if the mobile device transfers to the home network and back to the roaming network during the registration delay, the method continues to block 416 at which a registration delay is identified. Such a registration delay can be any amount of delay. In some embodiments, the registration delay can be the same amount of time as the initial or previous registration delay. In other embodiments, the registration delay can be incremented, for example, by a multiple to increase the amount of time between registration requests.

It will be understood by those of ordinary skill in the art that the order of steps shown in the method 400 of FIG. 4 is not meant to limit the scope of the present invention in any way and, in fact, the steps may occur in a variety of different sequences within embodiments hereof. Any and all such variations, and any combination thereof, are contemplated to be within the scope of embodiments of the present invention.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more non-transitory computer-readable storage media having computer-executable instructions embodied thereon that, when executed, perform a method for facilitating delaying registration in association with roaming networks, the method comprising:
   recognizing that a mobile device is associated with a border coverage in that the mobile device is in an idle mode and alternates between connection to a home network and a roaming network, wherein the border coverage is an area where the mobile device receives services from the home network and the roaming network, and wherein the idle mode is where the mobile device does not actively use services; and based on the mobile device being associated with the border coverage, delaying registration with the roaming network, wherein delaying registration comprises delaying an assignment of a mobile internet protocol address to the mobile device, and wherein registration with the roaming network is delayed until a user of the mobile device initiates a call.

2. The media of claim 1 further comprising recognizing that the mobile device is connected to the roaming network.

3. The media of claim 1, wherein registration with the roaming network is delayed until a lapse of a time period for an initial registration delay.

4. The media of claim 1 further comprising initiating registration with the roaming network to obtain the mobile internet protocol address.

5. One or more non-transitory computer-readable storage media having computer-executable instructions embodied thereon that, when executed, perform a method for facilitating delaying registration in association with roaming networks, the method comprising:
   identifying that a mobile device is located within a border coverage area in which the mobile device is in an idle mode and alternates acquirement of a home network and a roaming network, wherein the border coverage area is where the mobile device receives services from the home network and the roaming network, and wherein the idle mode is where the mobile device does not actively use services;
   detecting that the mobile device is currently connected to the roaming network;
   in response to identifying that the mobile device is within the border coverage area and connected to the roaming network, delaying mobile internet protocol registration with the roaming network at least until a lapse of a registration delay, wherein delaying mobile internet protocol registration comprises delaying an assignment of a mobile internet protocol address to the mobile device, and wherein mobile internet protocol registration with the roaming network is delayed until a user of the mobile device initiates a call.

6. The media of claim 5, wherein the mobile device being located within the border coverage area is identified utilizing at least one of network identifiers or system identifiers provided by the home network or roaming network.

7. The media of claim 5, wherein the registration delay is an initial registration delay indicating an initial amount of delay for delaying the mobile internet protocol registration.

8. The media of claim 5, wherein the registration delay is a secondary registration delay indicating an amount of delay for delaying the mobile internet protocol registration that is subsequent to an initial amount of delay.

9. The media of claim 8, wherein the secondary registration delay is greater than the initial amount of delay.

10. The media of claim 9, wherein the secondary registration delay is utilized based on the mobile device alternating connection with the roaming network and the home network during the initial amount of delay.

11. The media of claim 5, wherein the registration delay is identified.

12. A method for facilitating delaying registration in association with roaming networks, the method comprising:
   recognizing that a mobile device having border coverage is connected to a roaming network, wherein the border coverage is an area where the mobile device is in an idle mode and receives services from a home network and the roaming network, and wherein the idle mode is where the mobile device does not actively use services;
   identifying a registration delay that indicates an amount of time for delaying mobile internet protocol registration in association with the roaming network;
   delaying the mobile internet protocol registration in accordance with the registration delay, wherein delaying the mobile internet protocol registration comprises delaying an assignment of a mobile internet protocol address to the mobile device; and
   requesting the mobile internet protocol registration from the roaming network, wherein the mobile internet protocol registration is requested upon initiation of a call via the mobile device.

13. The method of claim 12, wherein network identifiers and system identifiers are utilized to recognize that the mobile device having border coverage is connected to the roaming network.

14. The method of claim 12, wherein the registration delay is an initial registration delay that indicates an initial amount of time for delaying the mobile internet protocol registration.

15. The method of claim 12, wherein the registration delay is a secondary registration delay that indicates a secondary amount of time for delaying the mobile internet protocol registration, the secondary amount of time being in addition to an initial amount of time that mobile internet protocol registration was delayed.

16. The method of claim 15, wherein the secondary amount of time for delaying mobile internet protocol registration is greater than the initial amount of time that mobile internet protocol registration was delayed.

17. The method of claim 12, wherein the mobile internet protocol registration is requested upon expiration of the registration delay.

18. The method of claim 12 further comprising receiving a mobile internet protocol address in response to the mobile internet protocol registration.

\* \* \* \* \*